UNITED STATES PATENT OFFICE.

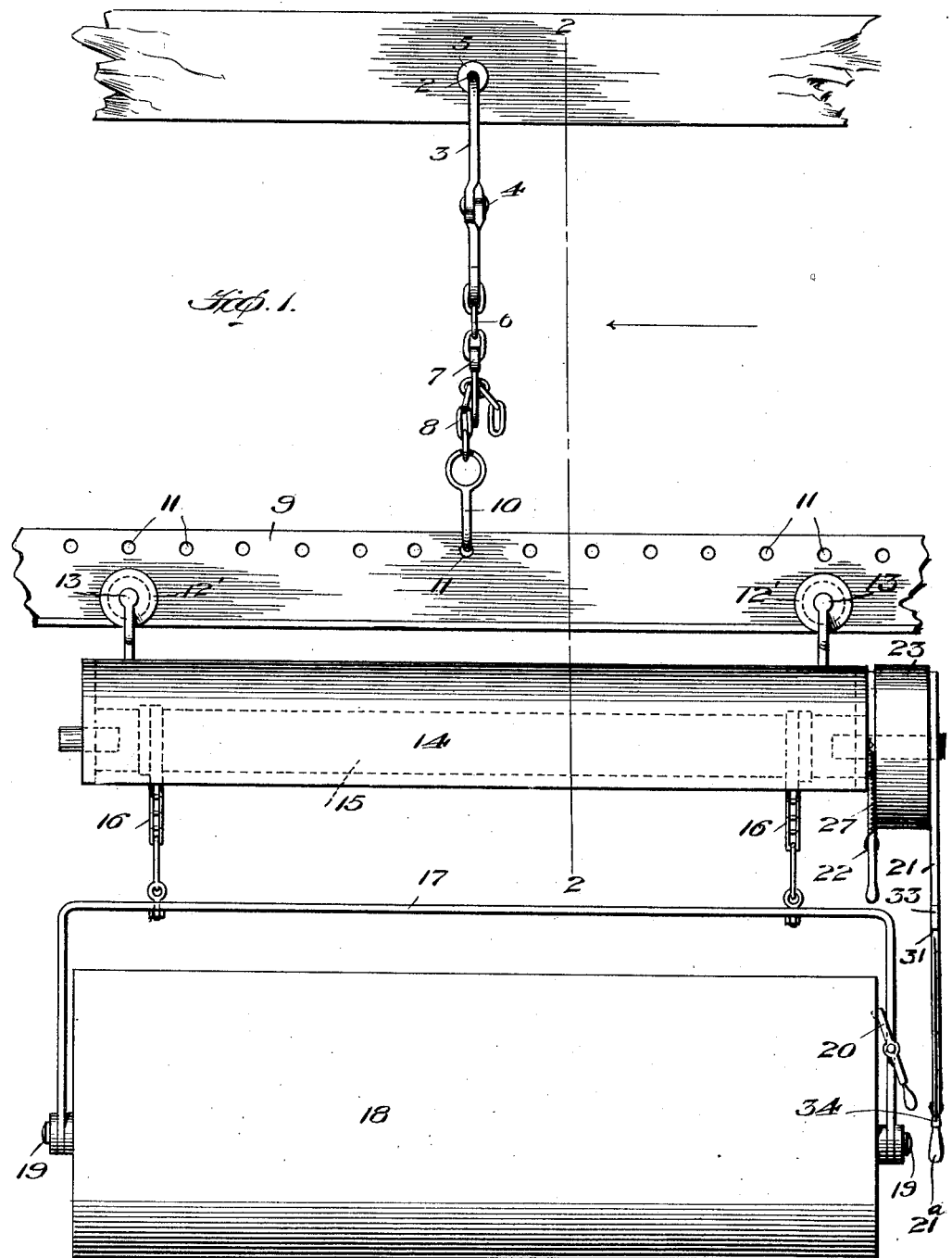

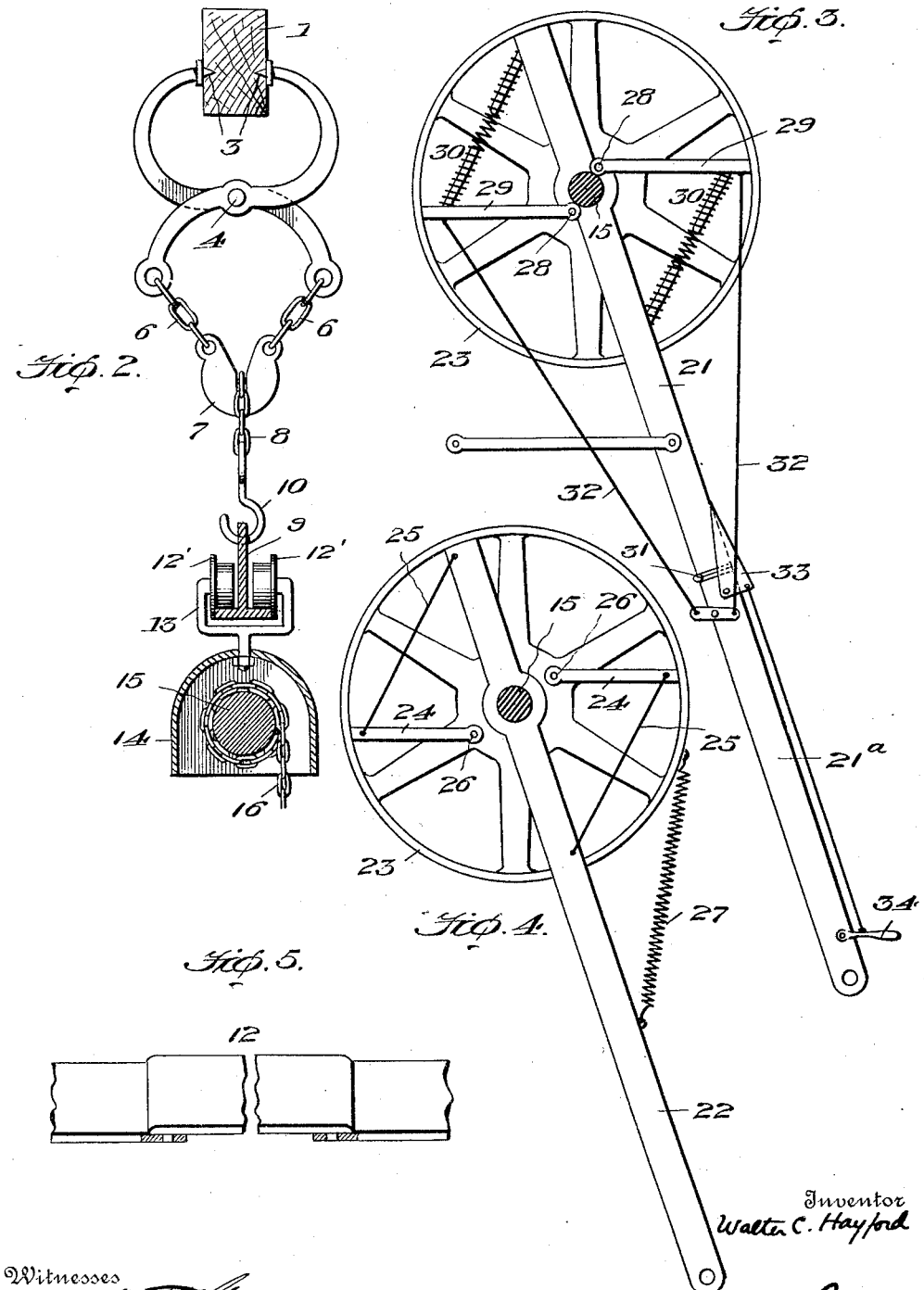
W. C. HAYFORD.
CLUTCH MECHANISM.
APPLICATION FILED FEB. 14, 1912.
1,113,624.
Patented Oct. 13, 1914.
2 SHEETS—SHEET 2.

WALTER C. HAYFORD, OF LAKE, INDIANA.

CLUTCH MECHANISM.

1,113,624.  Specification of Letters Patent.  Patented Oct. 13, 1914.

Application filed February 14, 1912. Serial No. 677,601.

*To all whom it may concern:*

Be it known that I, WALTER C. HAYFORD, a citizen of the United States, residing at Lake, county of Spencer, and State of Indiana, have invented certain new and useful Improvements in Clutch Mechanism, of which the following is a specification.

This invention relates to clutch mechanism.

The invention is carried out by the provision of improved clutch mechanism and operating means therefor as hereinafter set forth and recited in the claim.

In the accompanying drawings: Figure 1 is a side elevation showing the application of the invention to one use, the carrier being raised; Fig. 2, a section on line 2—2, Fig. 1; Fig. 3, a detail side elevation of the winding or take-up clutch; Fig. 4, a similar view of the locking clutch; and Fig. 5, a detail of a connector for the track.

The drawings illustrate one use to which the clutch and operating means constituting the present invention may be put.

The rafters 1 of the warehouse afford a support for the points 2 of the grapples 3 which are pivoted at 4, lugs 5 preventing too far entry of the points 2 in the rafters. Connected to the arms of the grapples 3, of which there may be as many as necessary, located at different points of the rafters, are chains 6 connected to a suspending device or yoke 7 with which the chain 8 may be adjustably connected by engaging any of its links therewith so that the track 9, of inverted T-shape, may be suspended at any height by the hooks 10 which pass through any of the numerous holes 11 provided in the web of the track 9. Any suitable coupling device or connector, such as shown at 12, in Fig. 5, may be employed to join the ends of the track 9. The provision of the suspending devices aforesaid enables the track to be put up at any point or readily taken down and to be maintained with great security because the weight of the carrier on the track tends to force the points 2 into the rafter.

Adapted to travel on the flanges constituting the track 9, are wheels or rollers 12′ from which are suspended hangers 13 in turn connected to a hood 14 which carries a drum or axle 15. Chains 16, connected to the axle 15, are adapted to wind thereon and are connected to the bail 17 of a bucket or carrier 18 which is of any preferred construction and connected to the bail in any preferred manner, preferably by trunnions or pivots 19 so that it may be tilted sidewise to dump its load. Any suitable locking device 20 may be employed to hold the carrier or bucket 18 in upright position. To elevate, secure, or to lower the bucket or carrier 18, there are provided independent clutches operated, respectively, by levers 21 and 22 whose clutches are adapted to coöperate with the inner face of a clutch wheel 23 on opposite sides of the spokes thereof, the wheel being secured to one of the ends of the axle 15. The levers 21 and 22 are both loose on the axle end 15. The dogs or pawls 24 which are controlled by rods 25 from the lever 23, are pivoted at 26 to the end of the hood 14. The lever 22 is retracted by a spring 27 connected to the hood 14 and its tendency is to throw the pawls or dogs 24 into engagement with the inner surface of the wheel 23 and thereby lock the axle 15 against rotation. This device constitutes an automatic locking clutch so that when the other clutch is operated to elevate the carrier 18, the axle 15 will be prevented from unwinding. On pulling down on the lever 22 against the action of its spring 27, the dogs 24 are disengaged from the wheel 23 and the axle 15 may then turn due to the height of the carrier or bucket 18, thus lowering by gravity.

Pivoted to the lever 21 at 28 are the dogs or pawls 29 which are pressed by springs 30 into engagement with the wheel 23. The lever 21 is formed in two parts 21 and 21ª hinged together at 31. Rods 32 connect the part 21ª with the respective dogs or pawls 29. At 33 there is provided a pivoted latch which rigidly connects the parts 21 and 21ª, the latch being controlled by a handle 34 by which it may be disengaged to permit the part 21ª to be swung on the hinge 31.

Ordinarily the latch 33 is locked. On moving the lever 21—21ª in one direction, the dogs 29 ride idly on the wheel 23 which is meanwhile held by the dogs 24. On moving the lever 21—21ª in the opposite direction, the dogs 29 are clutched with the wheel 23 and turn it, together with axle 15, thus winding up chains 16 and elevating the carrier 18. This operation may be repeated until the carrier is at the proper height whereupon it may be moved along the track 9 to the proper place where it is to be dumped. When it is desired to lower the carrier 18, the handle 34 is actuated, thereby causing the part 21ª to turn on the hinge 31 and operating the rods 32 to cause the dogs 29 to become permanently disengaged from the wheel 23. The operator may now depress the lever 22 which disengages dogs 24 from the wheel 23 and the carrier 18 will then descend by gravity as the axle 15 is free to turn and permit unwinding of the chains 16. On the release of the lever 22 the pawls 24 immediately clutch the wheel 23 and hold the carrier in suspended position. It may then be raised by engaging the latch 33 and operating the lever 21—21ª.

Having thus described my invention, what I claim as new and desire to secure by Letters Patent, is:—

In a clutch mechanism, a two-part operating lever consisting of sections jointed together, releasable means for locking the parts of the lever together, and clutch members operatively associated with the jointed outer part of the two-part lever, whereby on the release of the locking means aforesaid for the parts of the lever, the clutch members will be released.

In testimony whereof, I hereunto affix my signature in presence of two witnesses.

WALTER C. HAYFORD.

Witnesses:
  F. C. GORE,
  DE WITT Q. CHAPPELL.

Copies of this patent may be obtained for five cents each, by addressing the "Commissioner of Patents, Washington, D. C."